(12) United States Patent
Jones

(10) Patent No.: US 12,282,243 B2
(45) Date of Patent: Apr. 22, 2025

(54) ADJUSTABLE WEBCAM COVER

(71) Applicant: Jessica Jones, Chicago, IL (US)

(72) Inventor: Jessica Jones, Chicago, IL (US)

( * ) Notice: Subject to any disclaimer, the term of this patent is extended or adjusted under 35 U.S.C. 154(b) by 0 days.

(21) Appl. No.: 17/838,770

(22) Filed: Jun. 13, 2022

(65) Prior Publication Data
US 2023/0400750 A1    Dec. 14, 2023

(51) Int. Cl.
*G03B 11/04* (2021.01)
(52) U.S. Cl.
CPC .................. *G03B 11/041* (2013.01)
(58) Field of Classification Search
CPC .. G03B 11/041; G03B 11/045; G03B 17/566; G03B 11/04; G06F 1/1686
See application file for complete search history.

(56) References Cited

U.S. PATENT DOCUMENTS

| 11,422,434 B2 * | 8/2022 | Choi | H04N 5/225 |
| 2022/0299843 A1 * | 9/2022 | Tunney | G06F 1/1686 |
| 2022/0373861 A1 * | 11/2022 | Gilliam | G06F 1/1686 |

FOREIGN PATENT DOCUMENTS

| KR | 20210002378 U | * | 10/2021 | | G06F 1/1686 |
| WO | WO-2014029384 A1 | * | 2/2014 | | G03B 11/041 |
| WO | WO-2020045989 A1 | * | 3/2020 | | G03B 11/043 |

OTHER PUBLICATIONS

Agaotian Reusable Zip Ties 12 Inch Heavy Duty 100 Packs Releasable Zip Tie Round Ending No Hurt Removable Cable Ties Reusable Indoor Outdoor Tie Wraps for Wire No Slip Off https://www.amazon.com/Reusable-Ending-Durable-Outdoor-Multi-Purpose/dp/B0834ZF8S5/ref=sr_1_1_sspa?hvadid=174217931453&hvdev=c &hv (Year: 2019).*

* cited by examiner

*Primary Examiner* — Christopher E Mahoney
(74) *Attorney, Agent, or Firm* — Theodore J. Chiacchio; Chiacchio IP, LLC

(57) ABSTRACT

An adjustable webcam cover is provided. Adjustable webcam covers of the present disclosure may comprise a first interlocking component and a second interlocking component that may interlock with one another. Adjustability of webcam covers of the present disclosure may be realized through positioning of the first interlocking component relative to the second interlocking component about a device comprising a webcam lens. As such positioning is adjusted, there may be a corresponding adjustment of volume of space defined by interlocked first and second interlocking components. Adjustable webcam covers of the present disclosure may be securable to devices that comprise a webcam that vary in thickness at a point of attachment of a webcam cover to such device. Such devices may include, without limitation, computers, tablets, monitors, and other similar sorts of devices. Also provided herein are methods for obstructing a webcam's field of view utilizing webcam covers of the present disclosure.

2 Claims, 17 Drawing Sheets

ADJUSTABLE WEBCAM COVER

FIELD OF THE INVENTION

The present disclosure relates to a webcam cover. More particularly, the disclosure relates to a webcam cover that is adjustable through configuration of its component parts.

BACKGROUND

Webcams allow for interaction between people where participants are able to see some area in front of the webcam of other participants if the webcam is activated, is functioning properly, and if the field of view in front of the webcam is not being obstructed.

Usage of webcams in connection with desktop and laptop computers is widespread. With the increase in remote interpersonal interaction brought about by the COVID-19 pandemic, webcams have in recent years gained in prominence and usefulness.

It is not uncommon for individuals to remotely access others' webcams without authorization. Such unauthorized remote access may enable such unauthorized party to gain visual access to the webcam's field of view.

Webcam covers comprise physical barriers that may be positioned over top of a webcam. A post-it note, sticker, or other item may function as a webcam cover by positioning it over top of a webcam and securing such positioning using an adhesive such as tape or glue. Items specifically intended to serve as a webcam cover are marketed and sold throughout the U.S. and elsewhere.

Webcam covers are typically anchored to a computer, monitor, or other device comprising a webcam, at a point(s) that is immediately adjacent to, and in close proximity to, a webcam lens. What is needed is a webcam cover that is adjustable so that it may be secured to aspects of computers, monitors, and other devices that vary in thickness at the point of attachment of the webcam cover to the device.

SUMMARY

Webcam covers enabled by the present disclosure may comprise a first interlocking component and a second interlocking component that are capable of interlocking with one another. Webcam covers of the present disclosure may be adjusted in configuration thereby allowing for a corresponding adjustment of volume of space defined by interlocked first and second interlocking components. Adjustable webcam covers of the present disclosure may be secured to computers, tablets, monitors, and other similar sorts of devices comprising a webcam that vary in thickness at a point of attachment of a webcam cover to such device. Methods for obstructing a webcam's field of view using adjustable webcam covers as described and claimed herein are also enabled by this disclosure.

DETAILED DESCRIPTION

Figure 1:
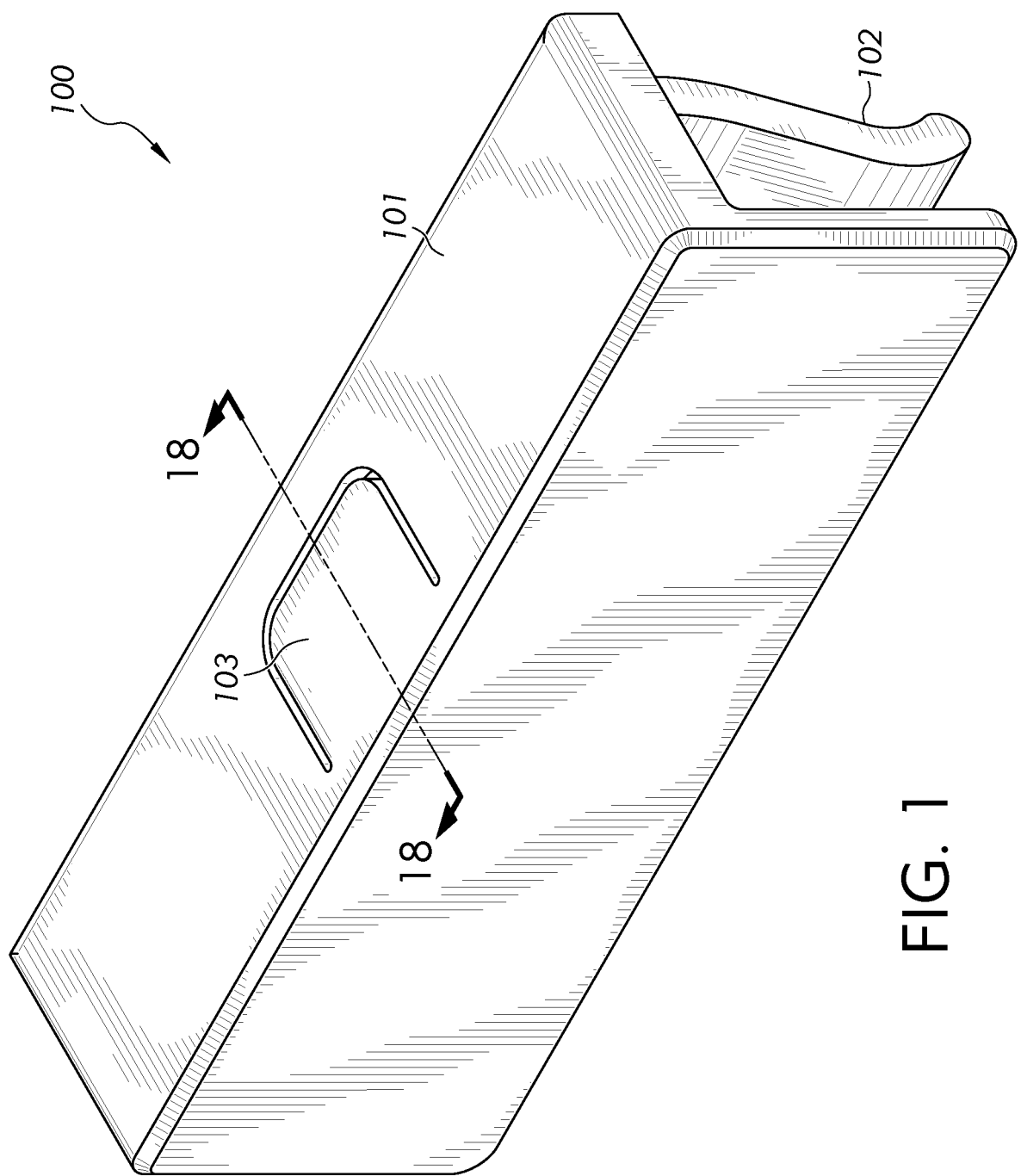
FIG. 1 is a top perspective view of an adjustable webcam cover in accordance with the present invention.

The following disclosure is provided to describe various embodiments of an adjustable webcam cover. Skilled artisans will appreciate additional embodiments and uses of the present invention that extend beyond the examples of this disclosure.

Singular forms should be read to contemplate and disclose plural alternatives. Similarly, plural forms should be read to contemplate and disclose singular alternatives. Conjunctions should be read as inclusive except where stated otherwise.

Expressions such as "at least one of A, B, and C" should be read to permit any of A, B, or C singularly or in combination with the remaining elements. Additionally, such groups may include multiple instances of one or more elements in that group, which may be included with other elements of the group. All numbers, measurements, and values are given as approximations unless expressly stated otherwise.

Various objects, features, aspects, and advantages described by this disclosure will become more apparent from the following detailed description, along with the accompanying drawings in which like numerals represent like components.

Various aspects of the present disclosure will now be described in detail, without limitation. In the following disclosure, an adjustable webcam cover will be discussed. Those of skill in the art will appreciate alternative labeling of webcam covers of the present disclosure as webcam lens covers, webcam lens caps, or other similar names. Skilled readers should not view the inclusion of any alternative labels as limiting in any way.

For the purpose of clearly describing the components and features discussed throughout this disclosure, some frequently used terms will now be defined, without limitation. As used herein, the term "flush" shall mean positioning of one object relative to another, wherein the two objects are at the same height, and such that they form a single smooth surface. As used herein, the term "hot stamping" shall mean a lithography printing process that uses heated image molds or stamping dies to transfer metal foils or pre-dried inks onto a surface. As used herein, the term "teeth" shall mean a series of protrusions substantially parallel to one another wherein there is some amount of space between them. As used herein, the term "approximately" shall mean close to and shall include a range of 5% of the value with respect to which "approximately" is used, above and below such value.

Adjustable webcam covers of the present disclosure 100, 200, 300, 400, 500, 600, 700, 800, 900, 1000, 1100, 1200, 1300, 1400, 1500, 1600 may comprise two interlocking components. A first interlocking component 101, 201, 301, 401, 501, 601, 701, 801, 901, 1001, 1101, 1201, 1301, 1401, 1501, 1600, 1801 of adjustable webcam covers of the present disclosure may comprise a female aspect. A second interlocking component 102, 302, 402, 502, 702, 802, 902, 1002, 1102, 1202, 1302, 1402, 1502, 1700, 1802 of adjustable webcam covers of the present disclosure may comprise a male aspect. The male aspect of the second interlocking component may be inserted into the female aspect of the first interlocking component.

The male aspect of second interlocking components of the present disclosure may comprise teeth 1701, 1804. Female aspects of first interlocking components of the present disclosure may comprise a shape 1601, 1803 that is capable of receiving teeth of a male aspect of a second interlocking component.

Figure 2:
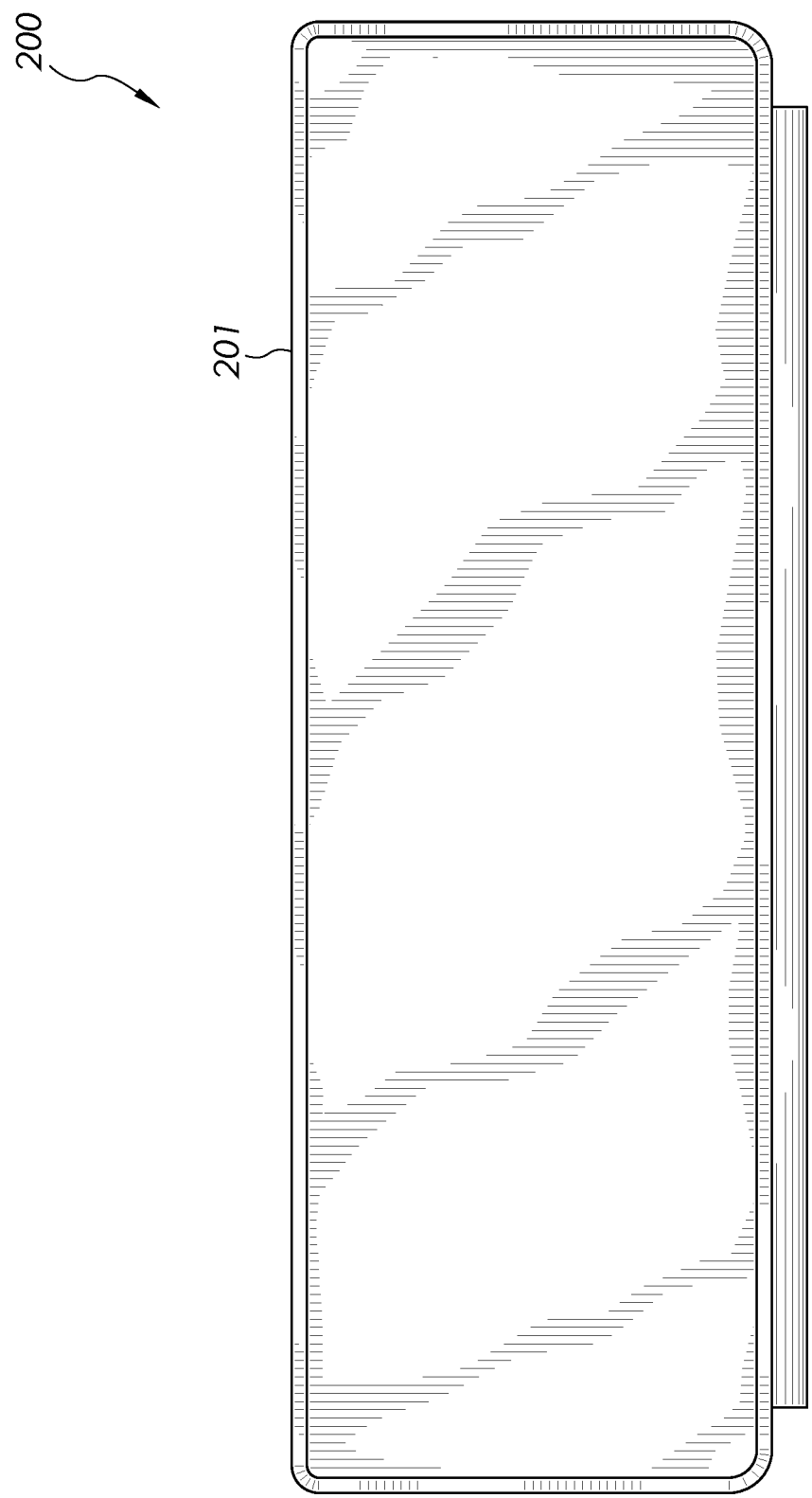
FIG. 2 is a front view of an adjustable webcam cover in accordance with the present invention.
Figure 3:
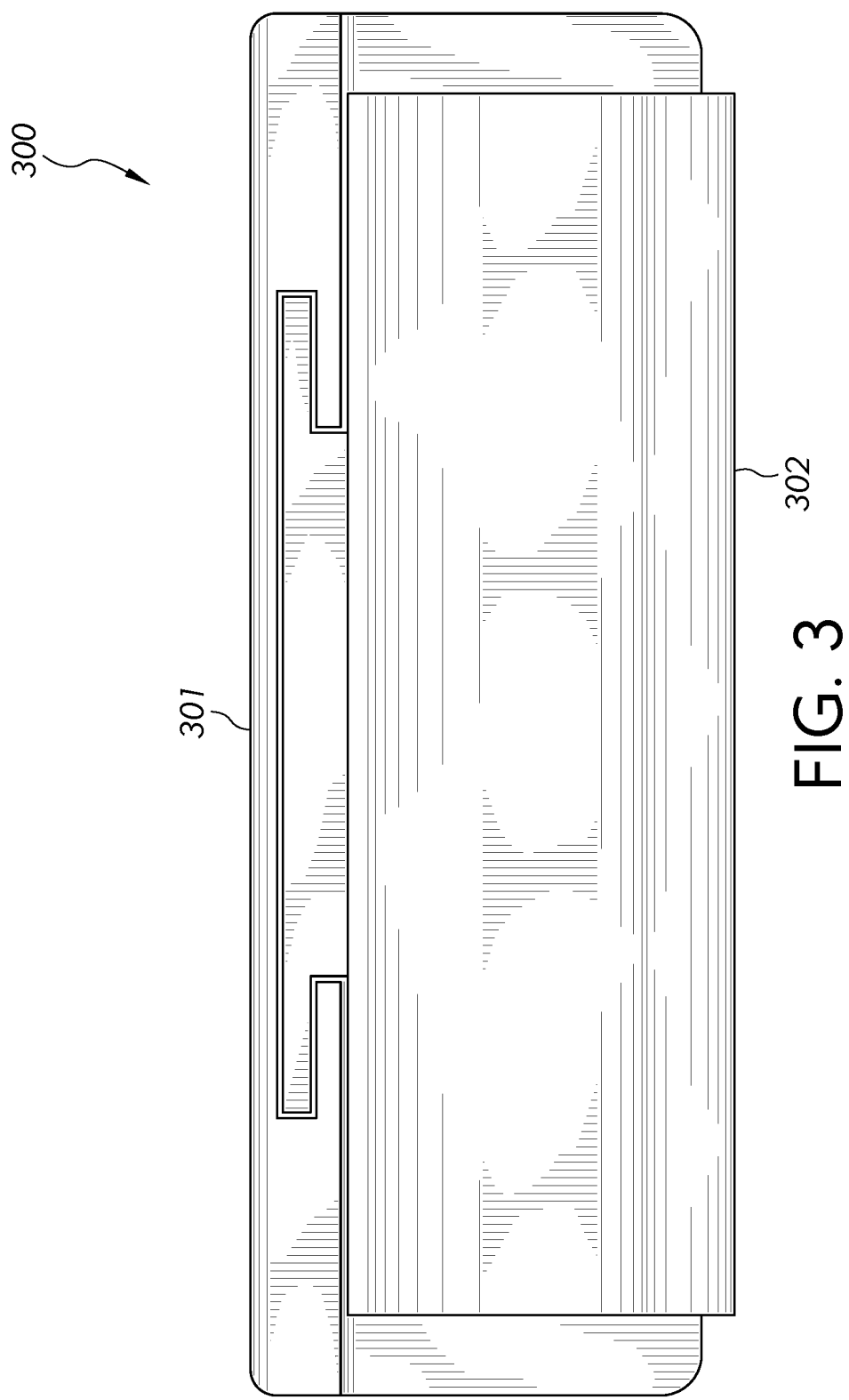
FIG. 3 is a rear view of an adjustable webcam cover in accordance with the present invention.
Figure 5:
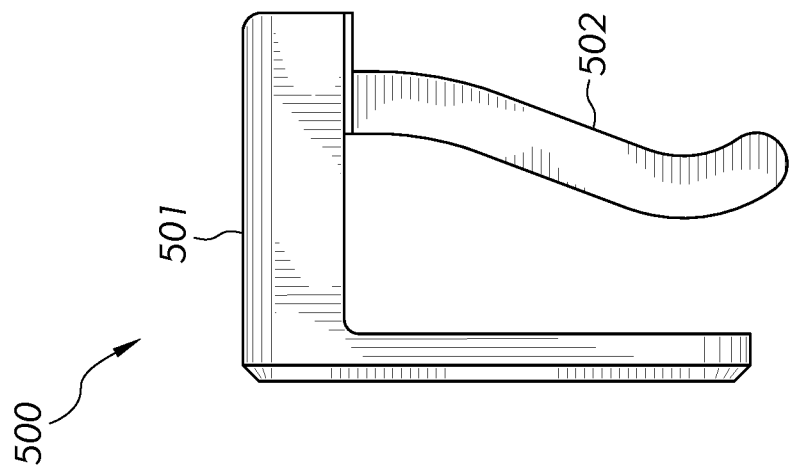
FIG. 5 is a left side view of an adjustable webcam cover in accordance with the present invention.
Figure 4:
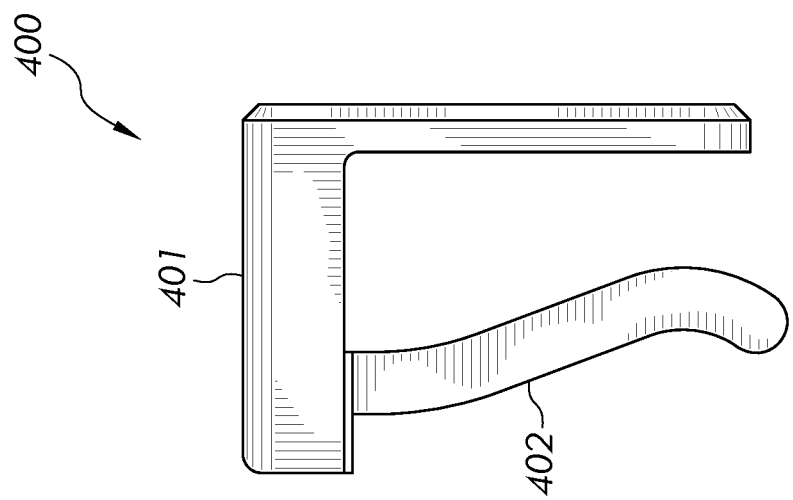
FIG. 4 is a right side view of an adjustable webcam cover in accordance with the present invention.
Figure 6:
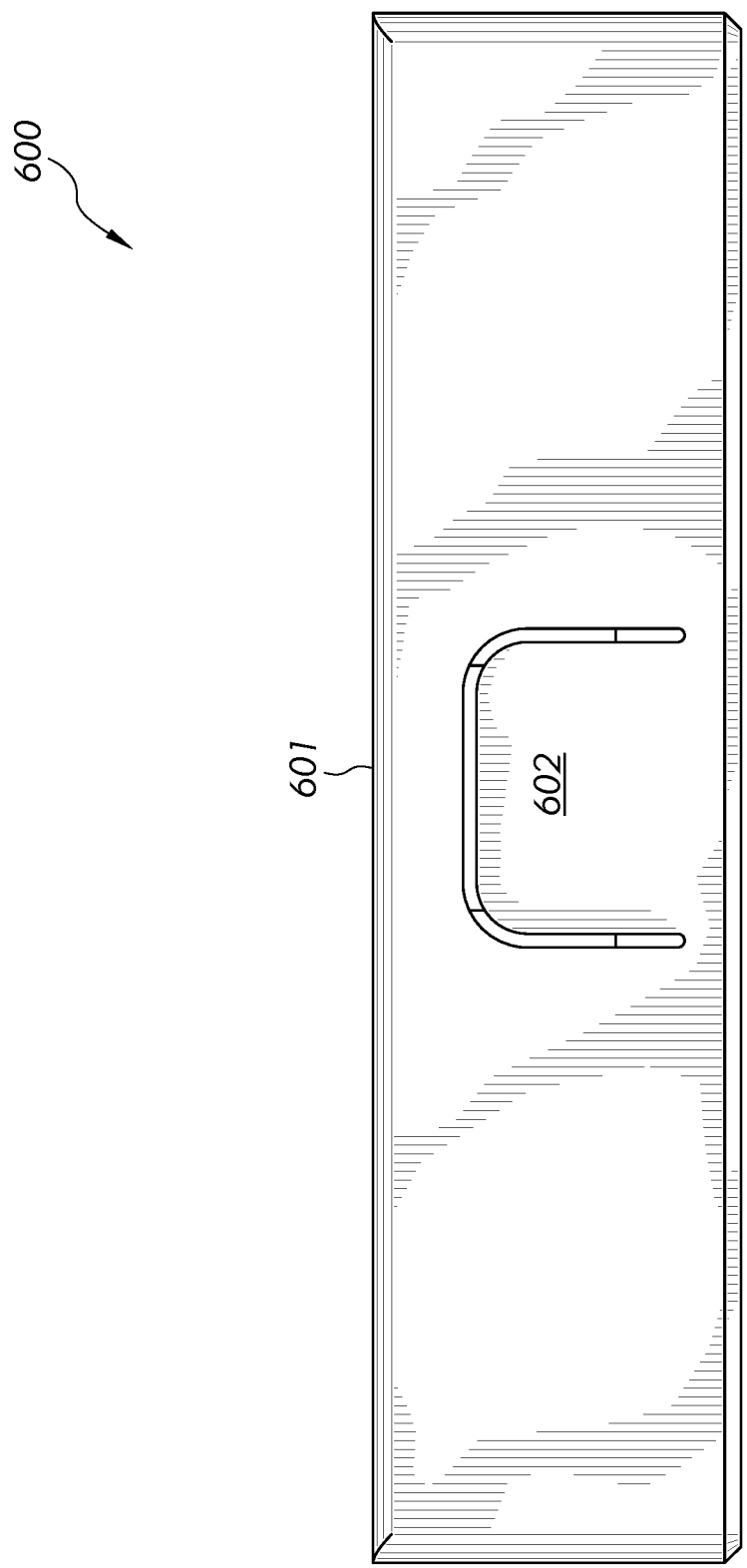
FIG. 6 is a top plan view of an adjustable webcam cover in accordance with the present invention.
Figure 7:
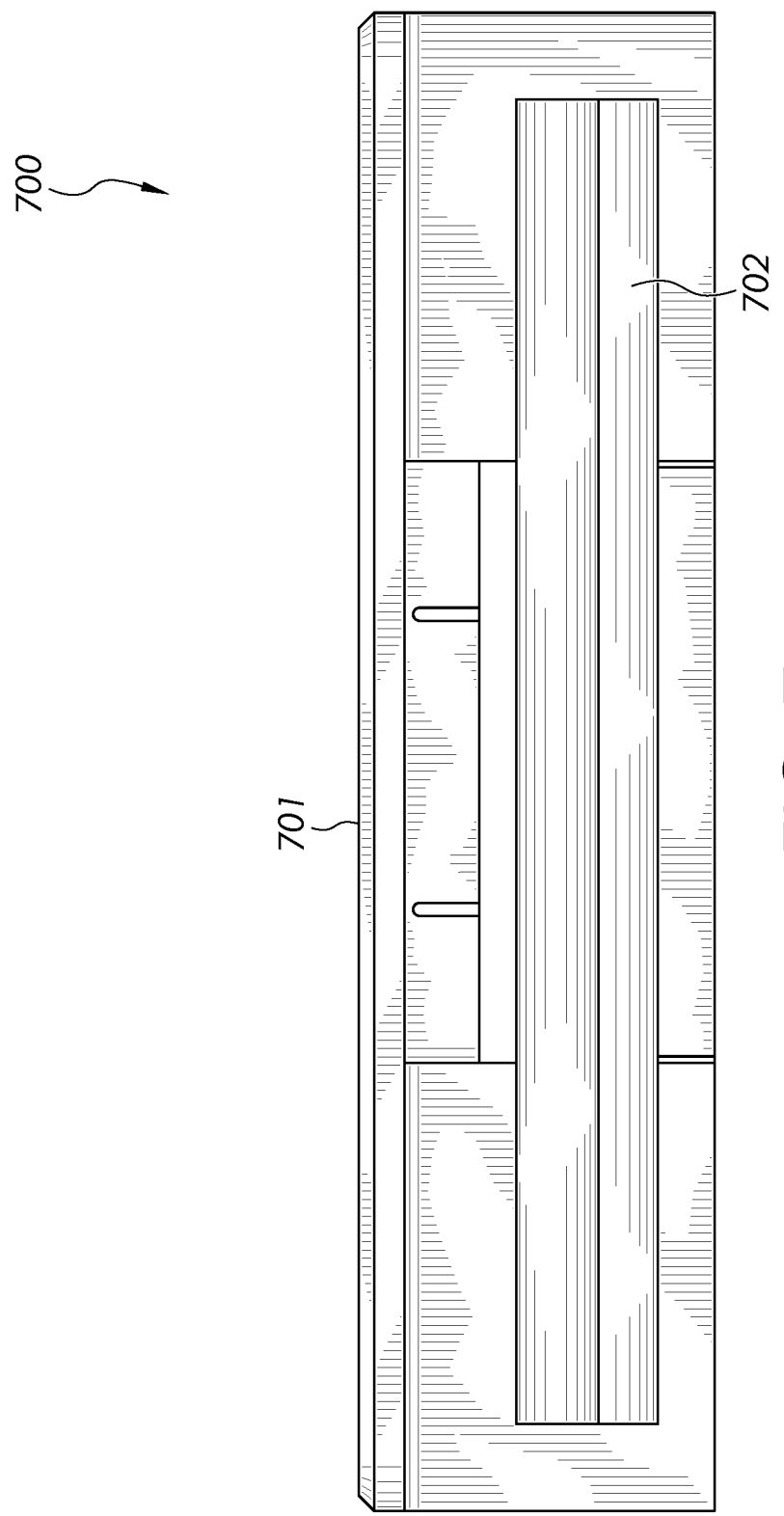
FIG. 7 is a bottom plan view of an adjustable webcam cover in accordance with the present invention.
Figure 8:
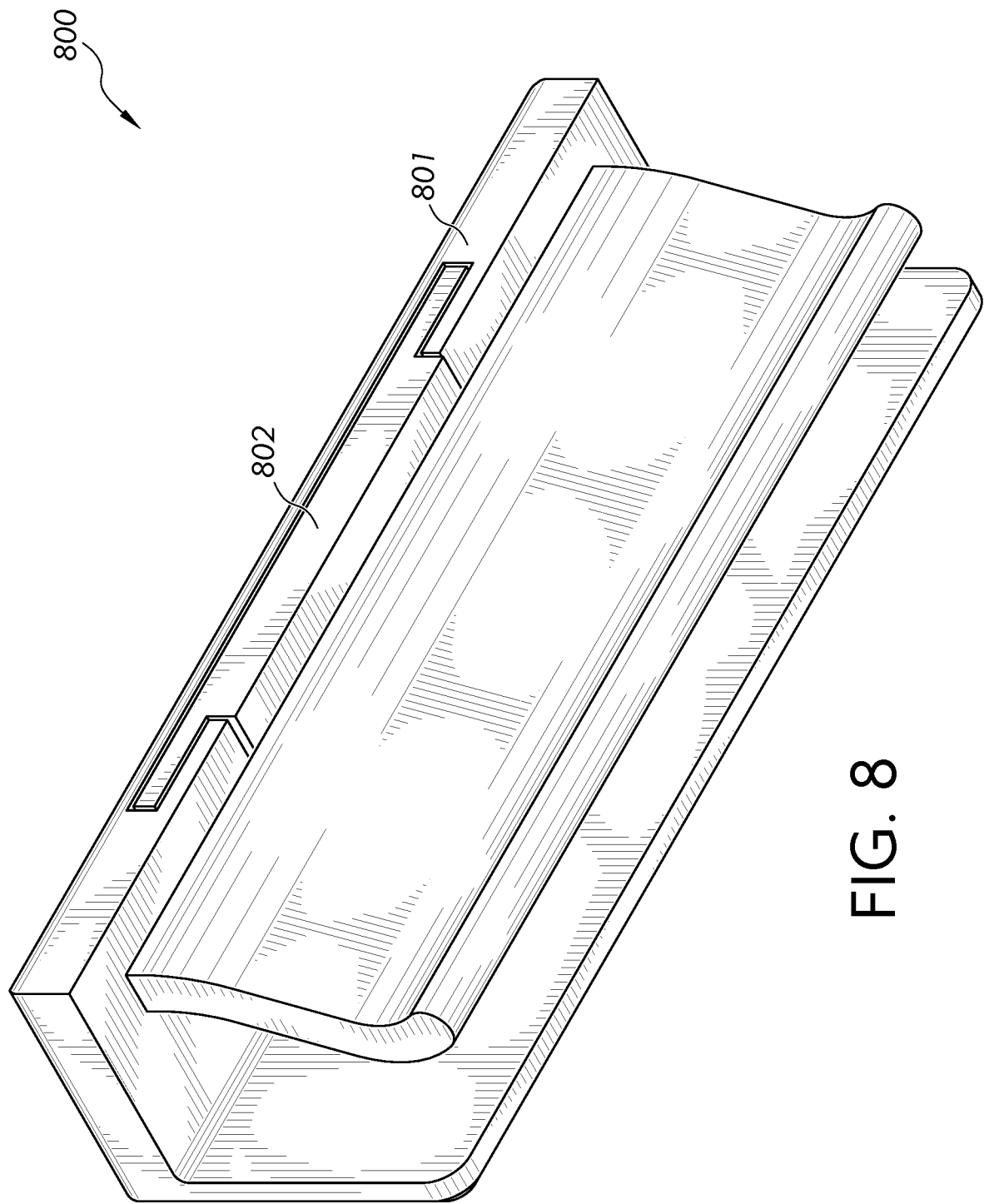
FIG. 8 is a bottom perspective view of an adjustable webcam cover in accordance with the present invention.
Figure 9:
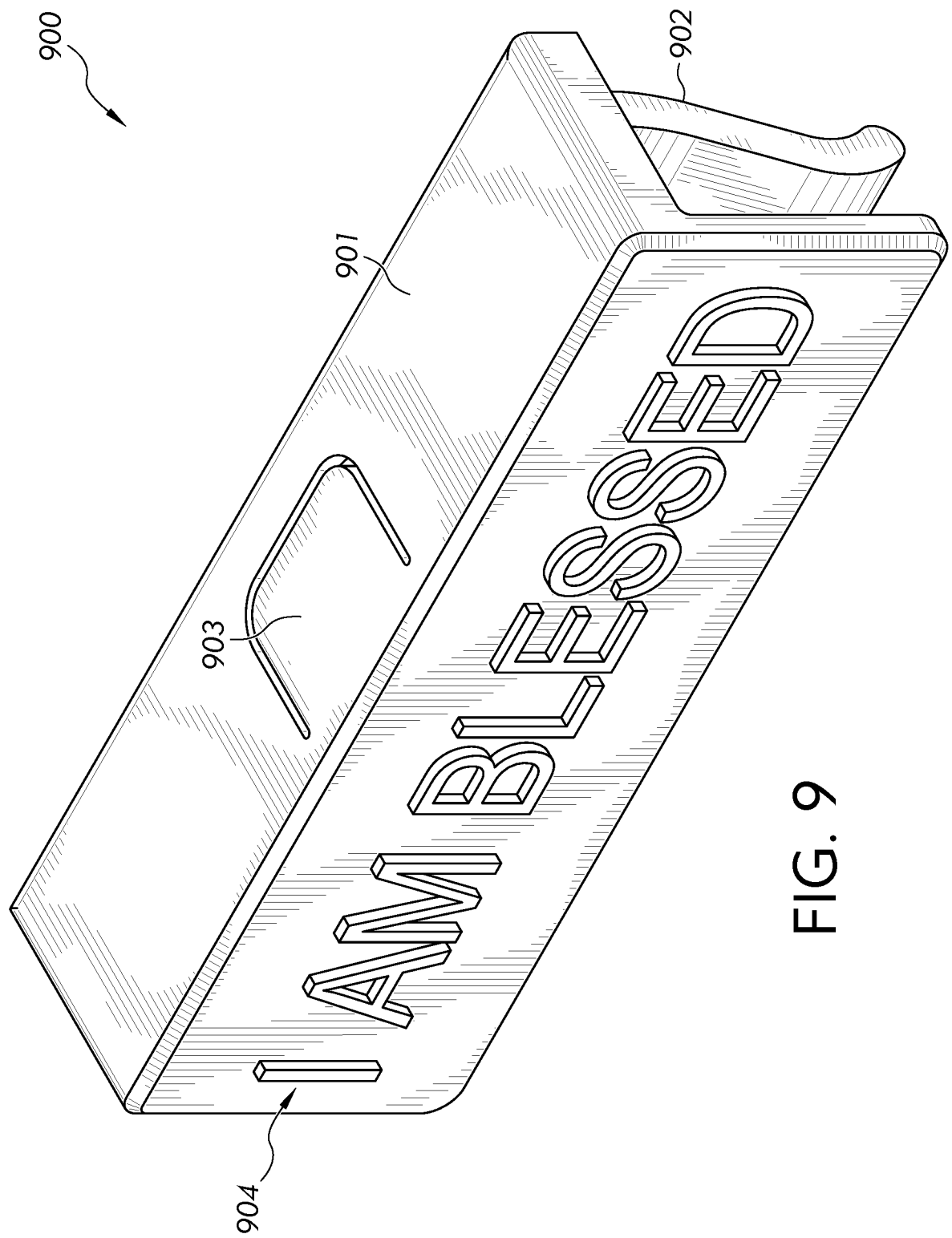
FIG. 9 is a top perspective view of an adjustable webcam cover in accordance with the present invention.
Figure 10:
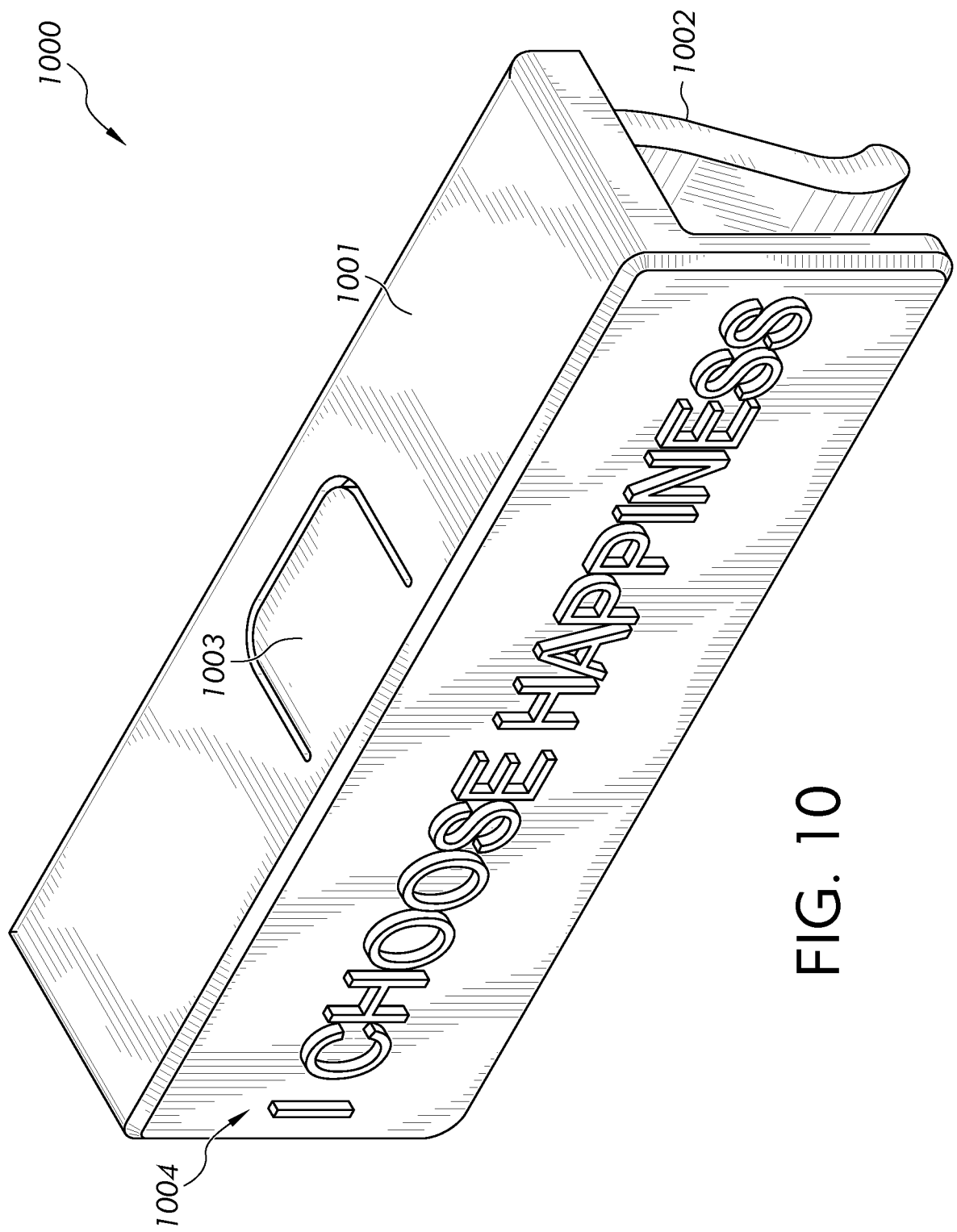
FIG. 10 is a top perspective view of an adjustable webcam cover in accordance with the present invention.
Figure 11:
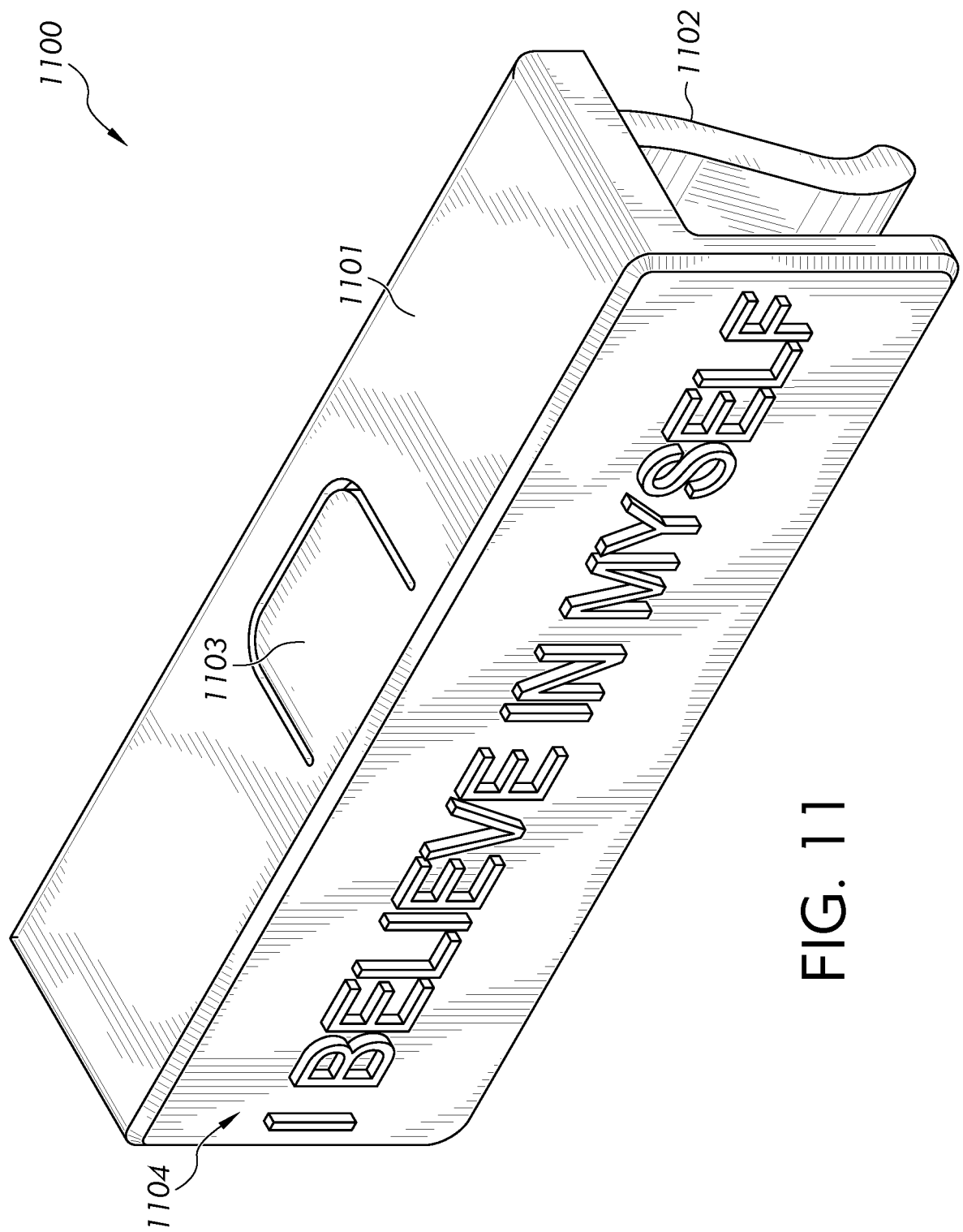
FIG. 11 is a top perspective view of an adjustable webcam cover in accordance with the present invention.
Figure 12:
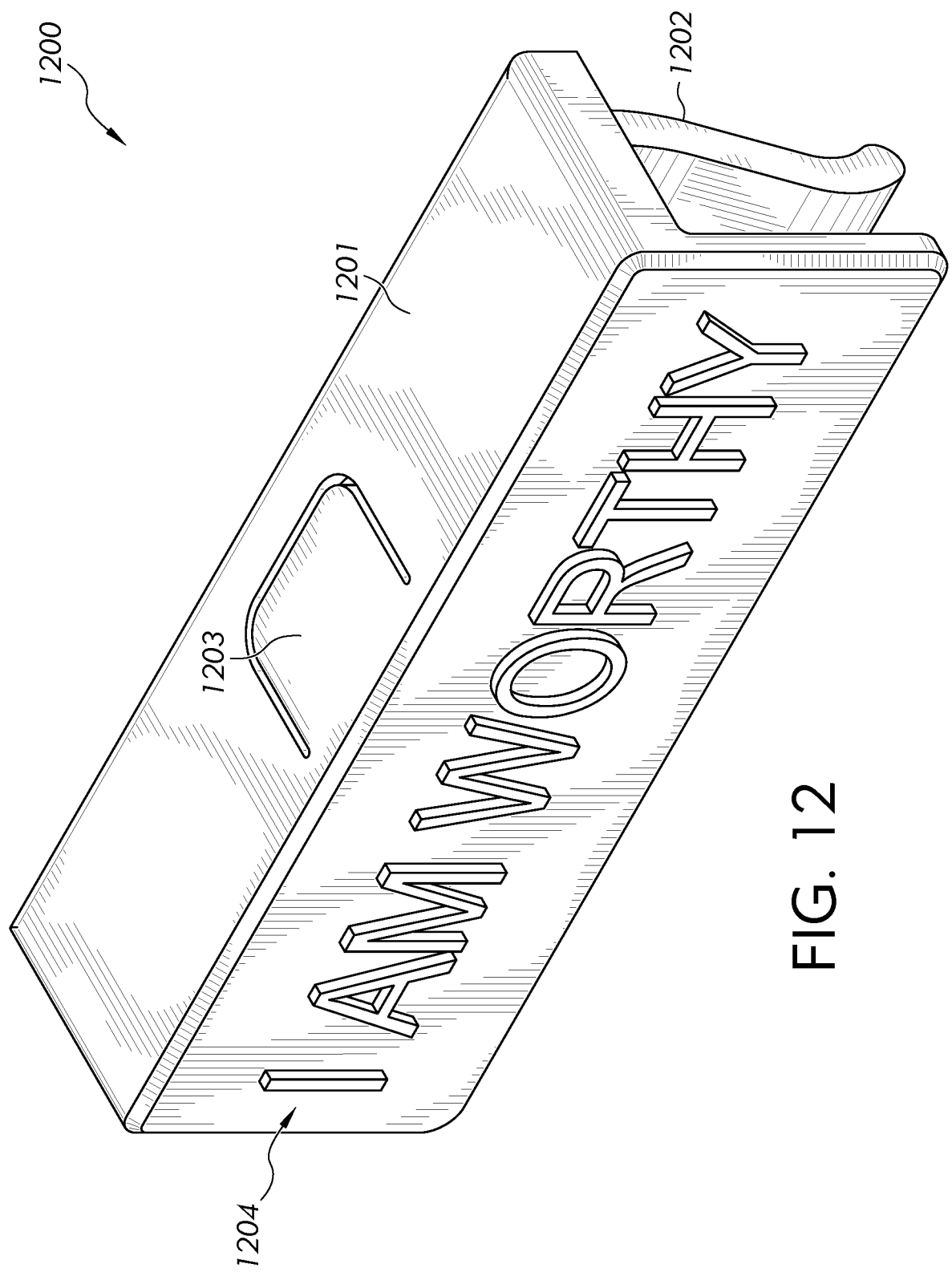
FIG. 12 is a top perspective view of an adjustable webcam cover in accordance with the present invention.
Figure 13:
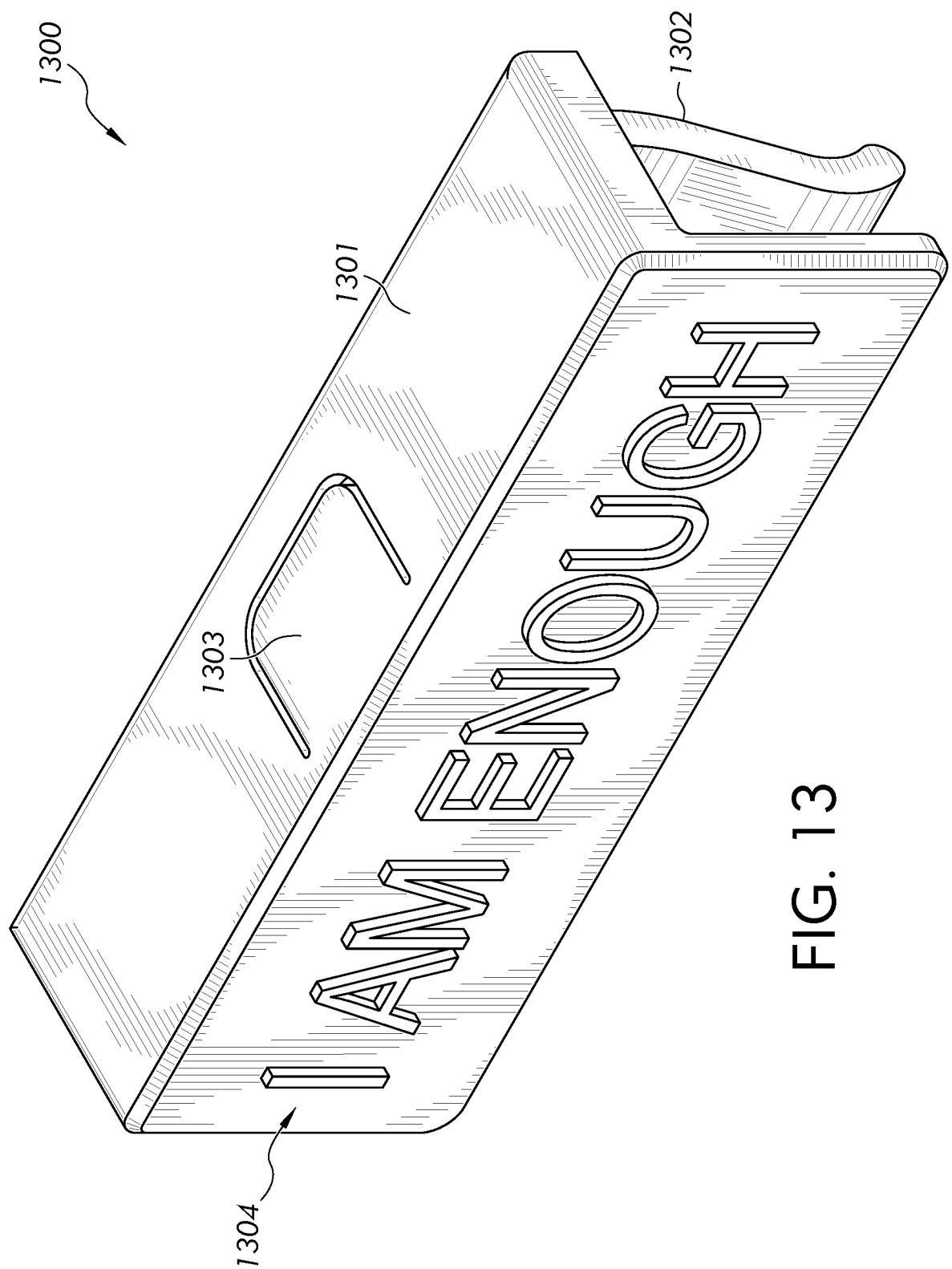
FIG. 13 is a top perspective view of an adjustable webcam cover in accordance with the present invention.
Figure 14:
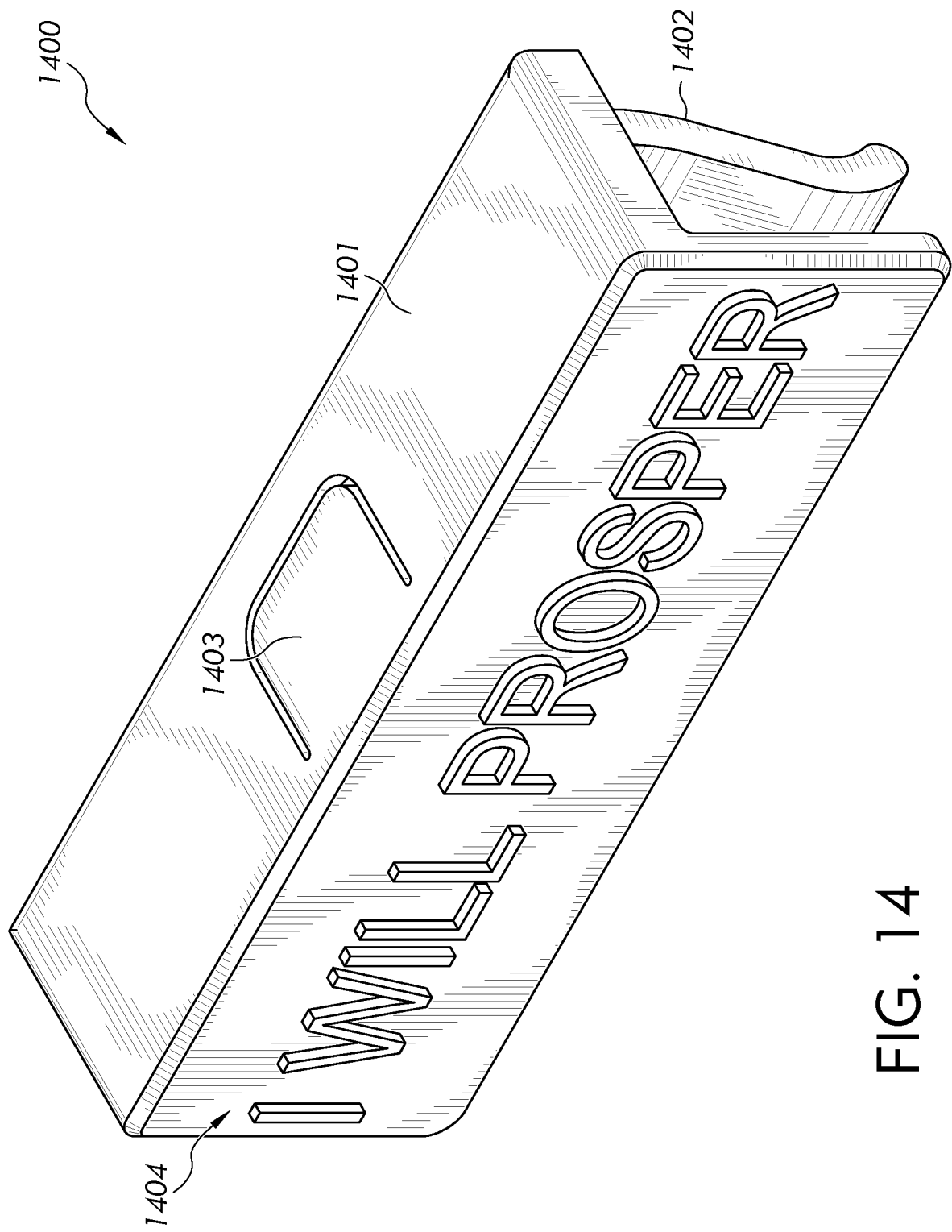
FIG. 14 is a top perspective view of an adjustable webcam cover in accordance with the present invention.
Figure 15:
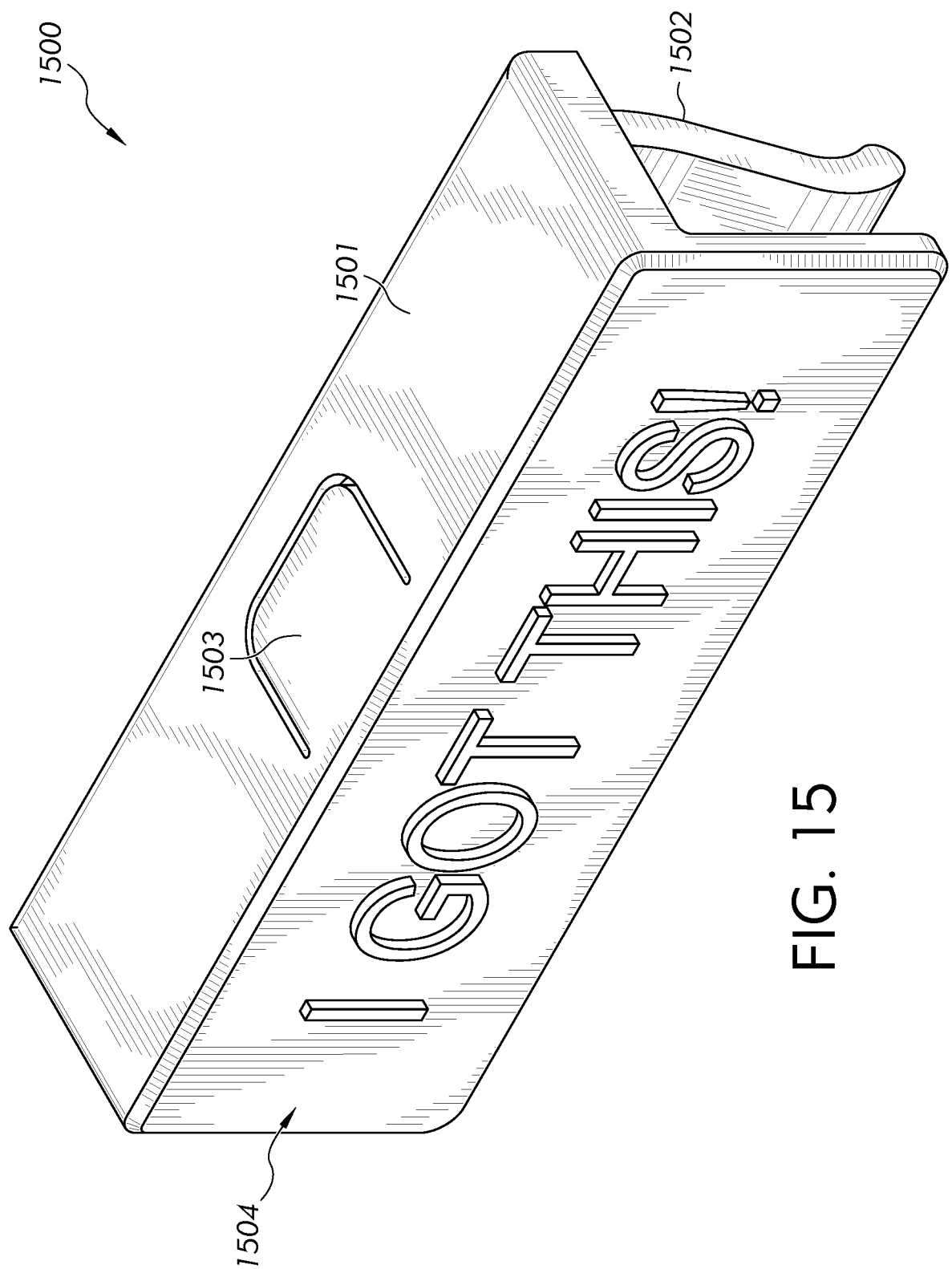
FIG. 15 is a top perspective view of an adjustable webcam cover in accordance with the present invention.
Figure 16:
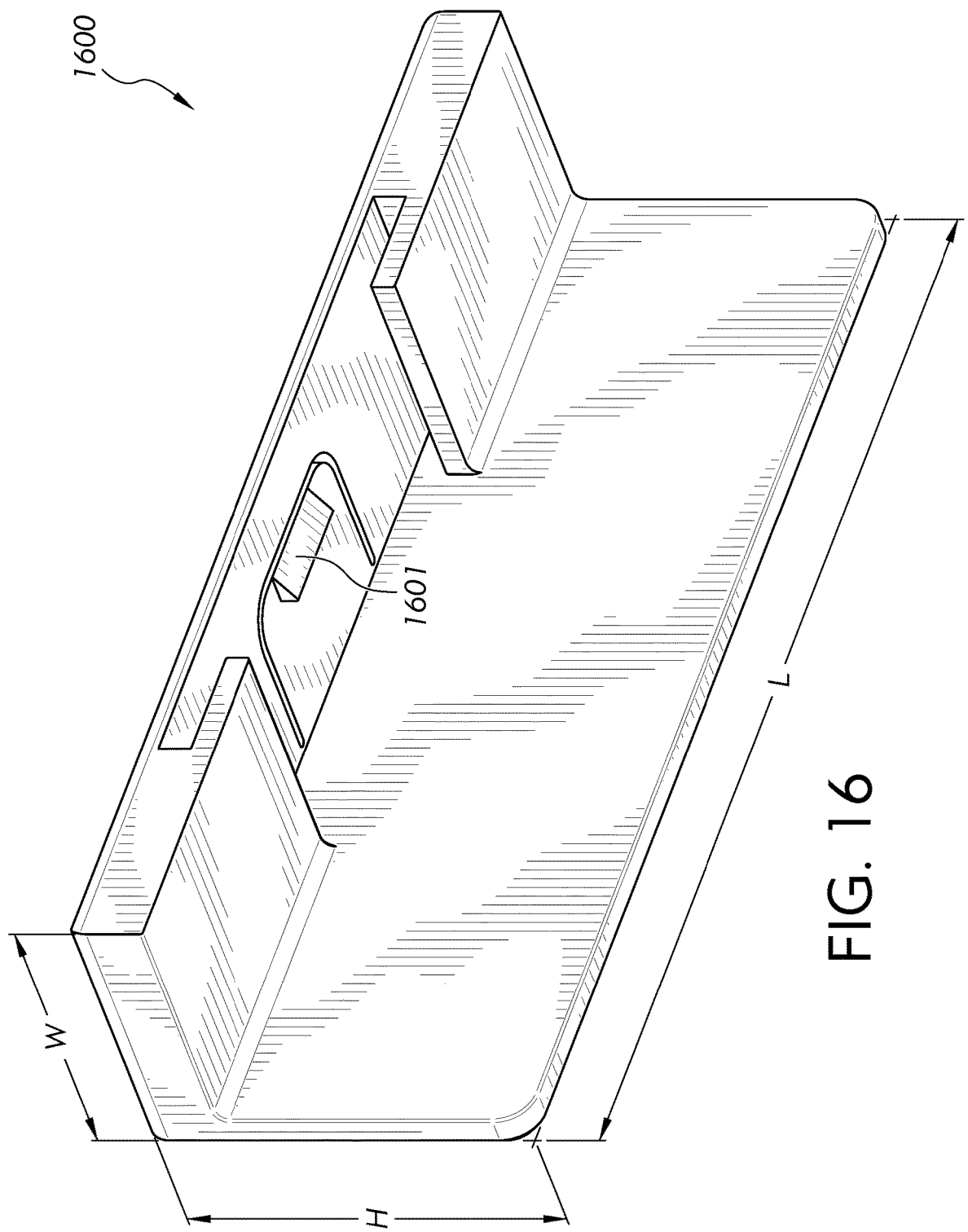
FIG. 16 is a top perspective view of a first interlocking component of an adjustable webcam cover in accordance with the present invention.
Figure 17:
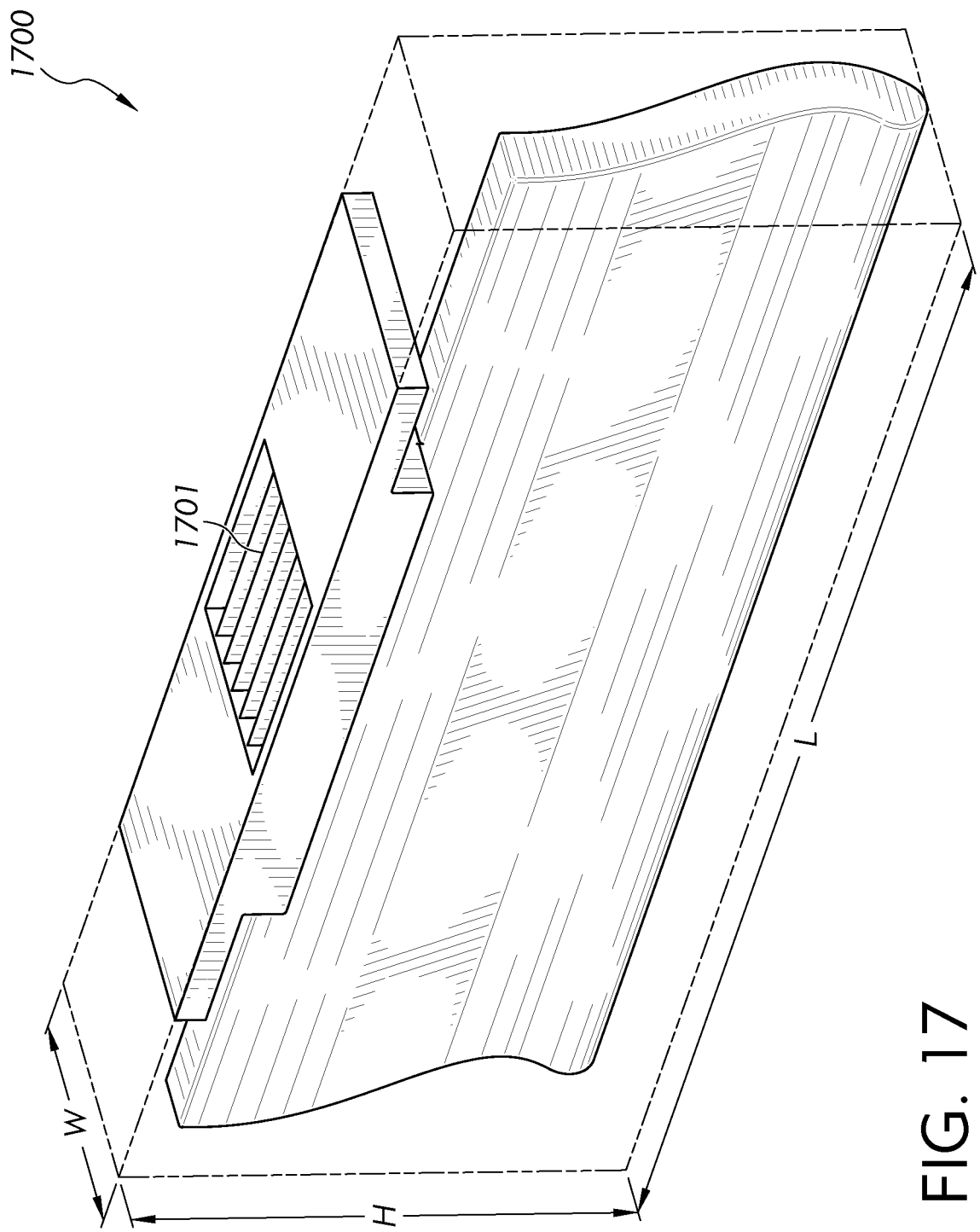
FIG. 17 is a top perspective view of a second interlocking component of an adjustable webcam cover in accordance with the present invention.
Figure 18:
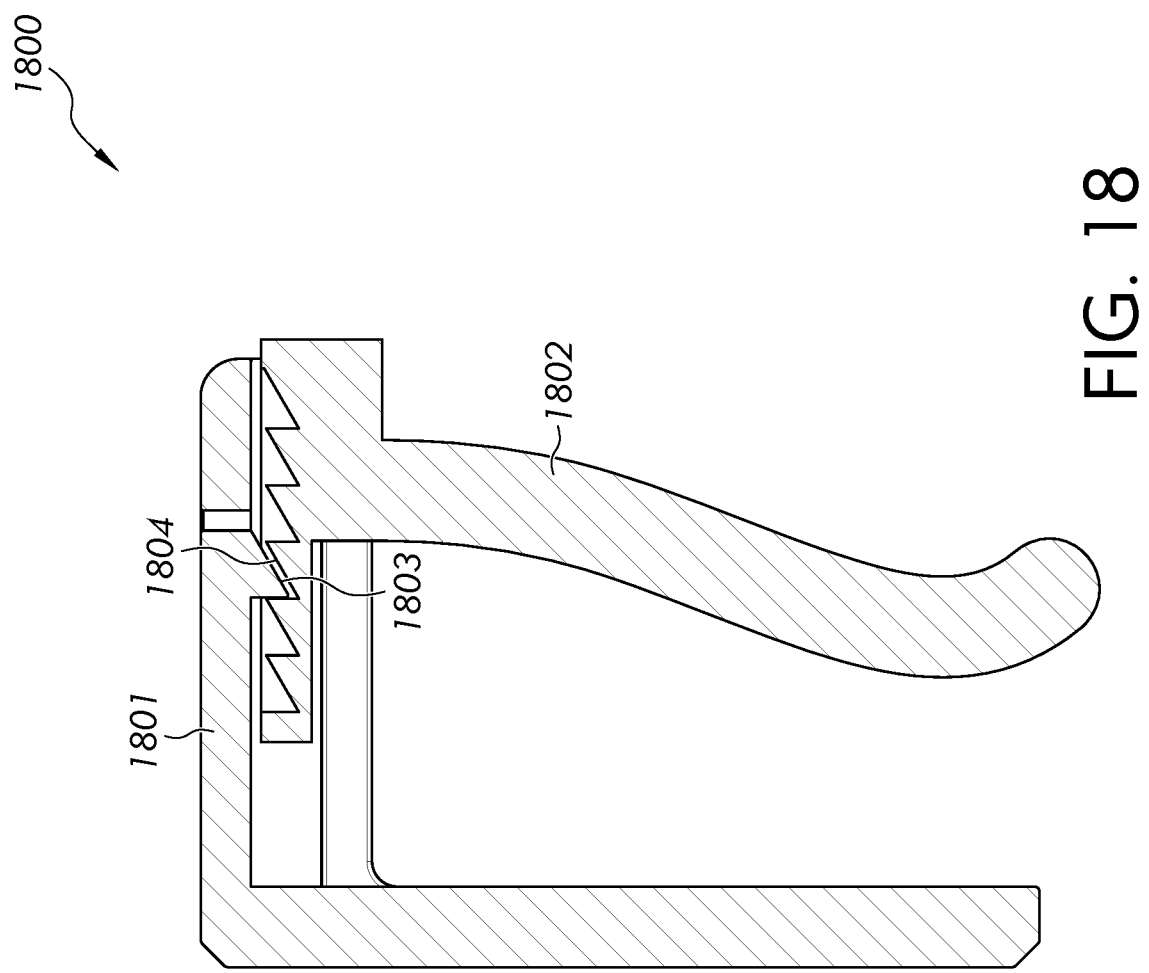
FIG. 18 is a left side view of an adjustable webcam cover in accordance with the present invention.

Second interlocking components as described herein may be inserted into first interlocking components of the present disclosure as depicted in FIGS. 1-15 and 18. Varying degrees of such insertion are possible as a result of the configuration of the first and second interlocking components relative to one another. Specifically, the number of teeth 1701, 1804 of the male component of the second interlocking component that are engaged with complimentary receiving aspects 1601, 1803 of the female aspect of the first interlocking component may determine the volume of space defined by interlocked first and second interlocking components. Such volume of space may be directly proportional to the degree of insertion of the second interlocking component into the first interlocking component, as ascertained by the number of teeth of the second interlocking component engaged with complementary aspects of the female aspect of the first interlocking component.

The degree of insertion of a second interlocking component into a first interlocking component may be selected by a user of adjustable webcam covers of the present disclosure.

First interlocking components of adjustable webcam covers of the present disclosure may comprise a latch component 103, 602, 903, 1003, 1103, 1203, 1303, 1403, 1503 on their front side. Such latch component may be connected to the female aspect 1601, 1803 of the first interlocking component. Pulling the latch component may effectuate retraction of the female aspect of the first interlocking component and disengagement of the female aspect from the male aspect of the second interlocking component.

Adjustable webcam covers enabled by the present disclosure may be constructed of any number of suitable materials, as would be readily appreciated by those skilled in the art. Such materials may include, without limitation, acrylonitrile butadiene styrene, high-density polyethylene, polypropylene, or polyamide.

First interlocking components of the present disclosure may vary in length, width, and height as appropriate to allow for positioning of an adjustable webcam cover of the present disclosure and for securing such webcam cover to a computer, tablet, monitor, or other similar device comprising a webcam lens. By way of example only, and without limitation, first interlocking components of adjustable webcam covers of the present disclosure may be between approximately 25 millimeters (mm) and approximately 75 mm in length; preferably between approximately 40 mm and approximately 60 mm in length. First interlocking components of adjustable webcam covers of the present disclosure may be between approximately 10 mm and approximately 16 mm in width; preferably between approximately 11 mm and approximately 14 mm in width. First interlocking components of adjustable webcam covers of the present disclosure may be between approximately 10 mm and approximately 20 mm in height; preferably between approximately 14 mm and approximately 18 mm in height.

First interlocking components of the present disclosure may have varying weights. By way of example only and without limitation, first interlocking components of the present disclosure may weigh between approximately 1.5 grams and approximately 3.4 grams; preferably between approximately 2.2 grams and approximately 3.2 grams.

Second interlocking components of the present disclosure may vary in length, width, and height as appropriate to allow for positioning of an adjustable webcam cover of the present disclosure and for securing such webcam cover to a computer, tablet, monitor, or other similar device comprising a webcam lens. By way of example only, and without limitation, second interlocking components of adjustable webcam covers of the present disclosure may be between approximately 38 mm and approximately 52 mm in length; preferably between approximately 42 mm and approximately 48 mm in length. Second interlocking components of adjustable webcam covers of the present disclosure may be between approximately 5 mm and approximately 10 mm in width; preferably between approximately 6 mm and approximately 9 mm in width. Second interlocking components of adjustable webcam covers of the present disclosure may be between approximately 12 mm and approximately 20 mm in height; preferably between approximately 14 mm and approximately 18 mm in height.

Second interlocking components of the present disclosure may have varying weights. By way of example only and without limitation, second interlocking components of the present disclosure may weigh between approximately 1.5 grams and approximately 3 grams; preferably between approximately 1.75 grams and approximately 2.25 grams.

First interlocking components as described herein may further comprise verbiage 904, 1004, 1104, 1204, 1304, 1404, 1504 on the front. Such verbiage may comprise messages intended to be inspirational affirmations for individuals reading them. Such verbiage may appear on the front of the first interlocking component through contouring of the first interlocking component itself. Such verbiage appearing on the front of the first interlocking component may be applied, without limitation, through hot stamping. The hot stamping process contemplated herein may utilize any color(s) for which hot stamping may be technologically feasible generally. The verbiage appearing on the front of the first interlocking component may comprise the following, without limitation: "I Am Worthy"; "I Am Enough"; "I Am Fearless"; "I Got This!"; "I Am Blessed"; "I Choose Happiness"; and "I Believe In Myself."

Adjustable webcam covers as described herein may be utilized in connection with methods for obstructing a field of view of a webcam. Such methods may comprise providing an adjustable webcam cover comprising a first interlocking component and a second interlocking component, wherein the first interlocking component comprises a female aspect and the second interlocking component comprises a male aspect. Such methods may comprise positioning the first interlocking component on a first side of a device comprising a webcam lens and positioning the second interlocking component on a second side of a device comprising a webcam lens. Such methods may further comprise collapsing the first interlocking component and the second interlocking component toward one another until the webcam cover is firmly secured to the device.

As discussed in greater detail above, first interlocking components and second interlocking components of the present disclosure may vary in length, width, and height as appropriate to allow for positioning of the adjustable webcam cover and for securing the webcam cover to a computer, tablet, monitor, or other similar device. Those of skill in the art will readily appreciate the types of devices to which adjustable webcam covers of the present disclosure may be attached in a secure and stable manner. Suitable weights for first interlocking components and second interlocking components of the present disclosure are also discussed in detail above.

While various aspects of adjustable webcam covers of the present disclosure have been described above, the description of this disclosure is intended to illustrate and not limit the scope of the invention. The invention is defined by the scope of the claims and not the illustrations and examples provided in the above disclosure. Skilled artisans will appreciate additional aspects of the invention, which may be realized in alternative embodiments, after having the benefit of the above disclosure. Other aspects, advantages, embodiments, and modifications are within the scope of the claims.

The invention claimed is:

1. An adjustable webcam cover comprising:
   a first interlocking component;
   a second interlocking component;
   the first interlocking component comprising a first end and a second end, wherein the first end comprises a female aspect, and wherein the second end comprises a flat aspect;
      wherein the flat aspect is attached perpendicularly to the first end;
      the flat aspect being configured to allow for being heat stamped;
   the second interlocking component comprising a third end and a fourth end,
      wherein the third end comprises a male aspect;
      wherein the fourth end comprises a bended aspect;
      wherein the male aspect comprises teeth configured to be received by the female aspect;
   and wherein the teeth and the female aspect capable of receiving the teeth are substantially flush relative to one another in a substantially planar orientation when substantially fully engaged with each other;
   wherein the female aspect further comprises a latch component;
   the latch component being configured to effectuate retraction of the female aspect away from the male aspect when negative force is applied to the latch component;
   wherein the first interlocking component and the second interlocking component are physically separate from one another prior to engagement; and wherein the adjustable webcam cover is not integrated into a device comprising the webcam.

2. The adjustable webcam cover of claim 1 wherein the first interlocking component is between 25 mm and 39 mm in length, 10 mm in width, and between 10 mm and 13 mm in height; and the second interlocking component is between 38 mm and 41 mm in length, 5 mm in width, and between 12 mm and 13 mm in height.

* * * * *